United States Patent
Figg et al.

(10) Patent No.: US 9,940,631 B2
(45) Date of Patent: Apr. 10, 2018

(54) ONLINE CONTENT COLLECTION

(75) Inventors: Matthew Figg, Adelaide (AU); Jarred Holman, Wynn Vale (AU)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1568 days.

(21) Appl. No.: 13/599,310

(22) Filed: Aug. 30, 2012

(65) Prior Publication Data

US 2012/0323883 A1    Dec. 20, 2012

Related U.S. Application Data

(63) Continuation-in-part of application No. 12/396,645, filed on Mar. 3, 2009, now Pat. No. 8,386,314, and a continuation-in-part of application No. 13/455,885, filed on Apr. 25, 2012.

(51) Int. Cl.
*G06Q 30/02* (2012.01)
*G06Q 10/10* (2012.01)

(52) U.S. Cl.
CPC ............. *G06Q 30/02* (2013.01); *G06Q 10/10* (2013.01); *G06Q 30/0275* (2013.01)

(58) Field of Classification Search
CPC ..................................................... G06Q 30/02
USPC ............................................................ 705/14
See application file for complete search history.

(56) References Cited

U.S. PATENT DOCUMENTS

| | | | |
|---|---|---|---|
| 6,981,224 B1 | 12/2005 | Gardner et al. | |
| 2002/0004733 A1* | 1/2002 | Addante | 705/7 |
| 2002/0099695 A1 | 7/2002 | Abajian et al. | |
| 2004/0078294 A1* | 4/2004 | Rollins | G06Q 20/02 705/27.1 |
| 2004/0098493 A1* | 5/2004 | Rees | G06F 21/6218 709/229 |

(Continued)

FOREIGN PATENT DOCUMENTS

| | | |
|---|---|---|
| CN | 102033881 | 4/2011 |
| CN | 102591983 | 7/2012 |

(Continued)

OTHER PUBLICATIONS

Tess Trademark Search of Flash.*

(Continued)

*Primary Examiner* — Kambiz Abdi
*Assistant Examiner* — Michael R Stibley
(74) *Attorney, Agent, or Firm* — Mannava & Kang, P.C.

(57) ABSTRACT

An online content collection system includes a scanning server to scan web sites to retrieve a potential creative uniform resource locator (URL). The scanning and retrieving includes parsing web pages for the web sites, identifying a potential creative URL from the parsed web pages that matches a predetermined criterion for retrieving potential creative URLs, and retrieving the potential creative URL that matches the predetermined criterion. A data storage may be used to store creative URLs. An online content collection server analyzes the retrieved potential creative URL by determining whether the retrieved potential creative URL has been seen before by comparing the retrieved potential creative URL against the creative URLs stored in the data storage, and determining whether the retrieved potential creative URL points to a creative if the retrieved potential creative URL has been seen before.

9 Claims, 6 Drawing Sheets

(56) References Cited

U.S. PATENT DOCUMENTS

| | | | |
|---|---|---|---|
| 2004/0133471 A1 | 7/2004 | Pisaris-Henderson | |
| 2004/0227768 A1* | 11/2004 | Bates | G06F 17/30855 345/589 |
| 2005/0021397 A1 | 1/2005 | Cui et al. | |
| 2005/0021862 A1 | 1/2005 | Schroeder et al. | |
| 2005/0055275 A1 | 3/2005 | Newman et al. | |
| 2005/0137939 A1 | 6/2005 | Calabria et al. | |
| 2005/0209919 A1 | 9/2005 | Stubbs et al. | |
| 2006/0253583 A1 | 11/2006 | Dixon et al. | |
| 2007/0112960 A1 | 5/2007 | Joy et al. | |
| 2007/0282829 A1 | 12/2007 | Fontoura et al. | |
| 2007/0294401 A1* | 12/2007 | Shkedi | G06Q 30/02 709/224 |
| 2008/0065630 A1 | 3/2008 | Luo et al. | |
| 2008/0086368 A1 | 4/2008 | Bauman et al. | |
| 2008/0114624 A1 | 5/2008 | Kitts | |
| 2008/0140502 A1* | 6/2008 | Birnholz et al. | 705/10 |
| 2008/0201733 A1* | 8/2008 | Ertugrul et al. | 725/32 |
| 2008/0250446 A1 | 10/2008 | Zigmond et al. | |
| 2008/0270363 A1 | 10/2008 | Hunt et al. | |
| 2008/0301574 A1 | 12/2008 | Sanghvi et al. | |
| 2009/0197582 A1 | 8/2009 | Lewis et al. | |
| 2009/0257620 A1 | 10/2009 | Hicks | |
| 2009/0284530 A1 | 11/2009 | Lester | |
| 2009/0307081 A1 | 12/2009 | Rabbitt | |
| 2010/0076954 A1 | 3/2010 | Dulitz et al. | |
| 2010/0153217 A1 | 6/2010 | Kirkby et al. | |
| 2010/0235219 A1 | 9/2010 | Merrick et al. | |
| 2010/0241498 A1 | 9/2010 | Chung et al. | |
| 2010/0257022 A1 | 10/2010 | Wang et al. | |
| 2011/0035273 A1 | 2/2011 | Parikh et al. | |
| 2011/0125587 A1 | 5/2011 | Netzer et al. | |
| 2012/0173552 A1 | 7/2012 | Zhu et al. | |

FOREIGN PATENT DOCUMENTS

| | | |
|---|---|---|
| EP | 2270736 A1 | 1/2011 |
| JP | 2001188703 A1 | 7/2001 |
| JP | 2002049553 A1 | 2/2002 |
| JP | 2008269045 A | 11/2008 |
| KR | 20080000810 A | 1/2008 |
| KR | 20080048790 A | 6/2008 |
| WO | 2008/002031 A1 | 1/2008 |

OTHER PUBLICATIONS

Tess Trademark Search of Java.*

M86 Secure Web Gateway v10.1; by Lipinski, Mike; SC Magazine vol. 23 issue 3 p. 41; Mar. 2012 (Year: 2012).*

"Notice of Reasons for Refusal" Japanese Application No. 2009-281229, Japanese Patent Office, dated Dec. 17, 2013, 6 pages.

"Extended European Search Report on EP Application No. 13004259.1", European Patent Office, dated Feb. 7, 2014, 5 pages.

"A Content Analysis of the Content Analysis Literature in Organization Studies: Research Themes, Data Sources, and Methodological Refinements" by: Duriau, Vincent J; Reger, Rhonda K; Pfarrer, Michael D; Organizational Research Methods; v1 On1 ; pp. 5-34; Jan. 2007.

"European Search Report", European Application No. 09012209.4, European Patent Office, dated Mar. 24, 2010.

Rui Chen et al., "Cindi Robot: an Intelligent Web Crawler Based on Multi-Level Inspection", Database Engineering and Applications Symposium, 2007, Ideas 2007, 11th International, IEEE, Piscataway, NJ, USA, Sep. 1, 2007, pp. 93-101, XP031137121.

Bun K K et al., "Emerging topic tracking system in WWW", Knowledge-Based Systems, Elsevier, vol. 19, No. 3, Jul. 1, 2006, pp. 164-171, XP025080344.

Martins B et al., "The WebCAT Framework-Automatic Generation of Meta-Data for Web Resources", Web Intelligece, 2005, Proceedings, the 2005 IEEE/WIC/ACM International AL Conference on Compiegne, France Sep. 19-22, 2005, pp. 236-242, XP010841644.

Viktor Krammer, "An Effective Defense Against Intrusive Web Advertising" Privacy, Security and Trust, 2008. PST '08, Sixth Annual Conference on, IEEE, Piscataway, NJ, USA, Oct. 1, 2008, pp. 3-14.

"Parse JavaScript links in HTML", IBM corp, IP.com Journal, IP.com Inc., West Henrietta, NY, US, Sep. 24, 2003.

Brin et al., "The anatomy of a large-scale hypertextual Web Search engine", Computer Networks and ISDN Systems, North Hollan Publishing, Amsterdam, NL, vol. 30, No. 1-7, Apr. 1, 1998, pp. 107-117.

"Patent Examination Report No. 1" on Australia Patent Application No. 2013221949, IP Australia, dated May 23, 2014, 6 pages.

Canadian Intellectual Property Office, "Office Action on Canadian Application No. 2,824,977", dated Feb. 20, 2017, 4 pages.

* cited by examiner

US 9,940,631 B2

ONLINE CONTENT COLLECTION

INCORPORATION BY REFERENCE

This application is a continuation-in-part of U.S. patent application Ser. No. 12/396,645, filed Mar. 3, 2009, and entitled "Online Ad Detection and Ad Campaign Analysis", and U.S. patent application Ser. No. 13/455,885, filed Apr. 25, 2012, and entitled "Online Content Campaign Classification", which are incorporated by reference in their entirety.

BACKGROUND

Online advertising typically includes posting advertisements (ads) on the Internet. The online ads may include a marketing message, and a user may be able to click on the ad, which typically takes the user to another web page for a product or service being marketed in the ad. Online ads may be designated as creatives that include, for example, images, click thrus, FLASH objects, etc. An online ad may be provided in the form of a banner ad, which is an ad embedded in a web page and often includes text, images, video, sound or any combination of those elements.

Placement of a creative on a particular web site may be purchased from an ad service or an ad network, referred to as ad vendors. For example, search engines typically offer ad services whereby an advertiser pays to have their creatives posted on the search engine web site or other affiliated web sites. Many web sites, in addition to search engines, offer similar services for posting creatives for companies or other entities.

In many instances, the creatives are required to be posted for a certain period of time and are required to be posted in certain locations on a web site or may be required to be posted in response to certain conditions being met. Many entities engage in sophisticated online advertising campaigns where they are competing against competitors for creative space and they are placing many creatives across many web sites. It is difficult to efficiently track the web sites to determine whether the web sites are posting their creatives, and whether the creatives include the proper content and are provided in the proper web page and in the proper location on the web page.

BRIEF DESCRIPTION OF DRAWINGS

Features of the present disclosure are illustrated by way of examples and not limited in the following figure(s), in which like numerals indicate like elements, in which.

DETAILED DESCRIPTION

Figure 1:
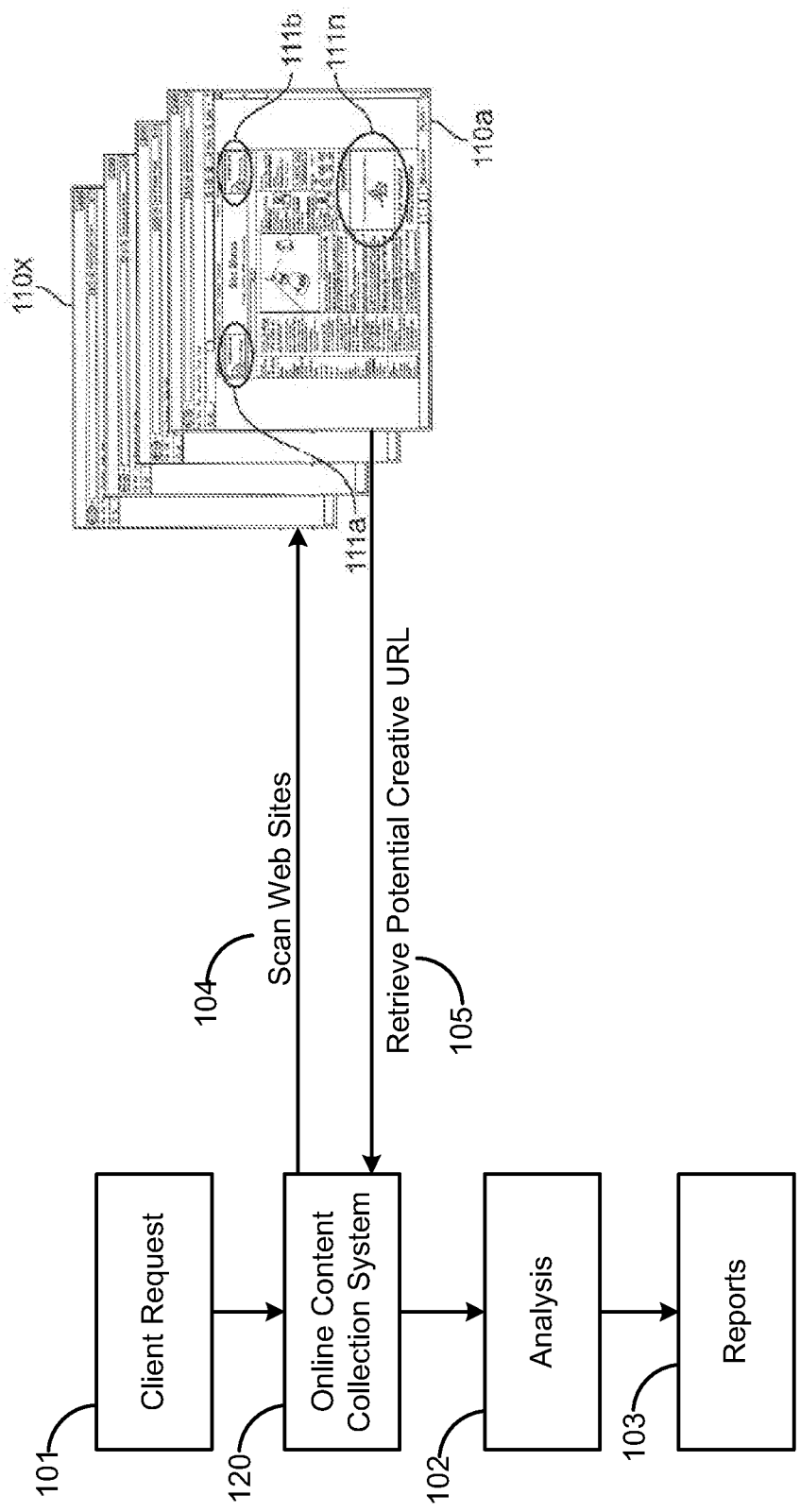
FIG. 1 illustrates a data flow diagram for an online content collection system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

According to an example, an online content collection system includes a scanning server to scan web sites to retrieve a potential creative uniform resource locator (URL). The scanning and retrieving includes parsing web pages for the web sites, identifying a potential creative URL from the parsed web pages that matches a predetermined criterion for retrieving potential creative URLs, and retrieving the potential creative URL that matches the predetermined criterion. A data storage may be used to store creative URLs. An online content collection server analyzes the retrieved potential creative URL by determining whether the retrieved potential creative URL has been seen before by comparing the retrieved potential creative URL against the creative URLs stored in the data storage, and determining whether the retrieved potential creative URL points to a creative if the retrieved potential creative URL has been seen before.

According to an example, a method for online content collection includes scanning web sites to retrieve a potential creative URL, retrieving the potential creative URL that matches a predetermined criterion for retrieving potential creative URLs, determining whether the retrieved potential creative URL has been seen before by comparing the retrieved potential creative URL against previously validated creative URLs, and determining whether the retrieved potential creative URL points to a creative if the retrieved potential creative URL has been seen before.

According to an example, a non-transitory computer readable medium including computer code that when executed by a computer system performs instructions including scanning web sites to retrieve a potential creative URL, retrieving the potential creative URL that matches a predetermined criterion for retrieving potential creative URLs, determining whether the retrieved potential creative URL has been seen before by comparing the retrieved potential creative URL against previously validated creative URLs, determining whether the retrieved potential creative URL points to a creative if the retrieved potential creative URL has been seen before, and downloading a creative that the retrieved potential creative URL points to if the retrieved potential creative URL has not been seen before.

For the online content collection system described above, the predetermined criterion includes using a regular expression to match the potential creative URL. The analysis by the online content collection server further includes removing query parameters before determining whether the retrieved potential creative URL has been seen before. The analysis also includes downloading a creative that the retrieved potential creative URL points to if the retrieved potential creative URL has not been seen before.

For the online content collection system described above, if the retrieved potential creative URL points to a creative, the analysis further includes determining whether the online content collection server recognizes a click thru URL associated with the creative. If the online content collection server does not recognize the click thru URL associated with the creative, the analysis further includes determining whether a web page content associated with the creative includes a click thru URL. If the web page content associated with the creative includes a click thru URL, the analysis further includes downloading the click thru URL in a web browser environment, and determining whether the click thru URL is a redirected URL. The analysis further includes determining whether the redirected URL has been seen before if the click thru URL is a redirected URL, indicating the click thru URL as being invalid if the redirected URL has been seen before, and downloading a subsequent redirected URL to determine whether the subsequent redirected URL is another redirected URL if the redirected URL has not been seen before. The analysis further includes determining whether the click thru URL is a HTML redirect if the click thru URL is not a redirected URL, storing the click thru URL in the data storage if the click thru URL is not a HTML redirect, and determining whether the HTML redirect has been seen before if the click thru URL is a HTML redirect.

For the online content collection system described above, if the retrieved potential creative URL does not point to a creative, the analysis further includes determining whether the retrieved potential creative URL with query parameters has been seen before.

For the online content collection system described above, the analysis further includes determining whether the retrieved potential creative URL is a redirected URL if the retrieved potential creative URL has not been seen before. The analysis further includes determining whether the redirected URL has been seen before if the retrieved potential creative URL is a redirected URL, indicating the creative associated with the retrieved potential creative URL as being invalid if the redirected URL has been seen before, and downloading a subsequent redirected URL to determine whether the subsequent redirected URL is another redirected URL if the redirected URL has not been seen before. The analysis further includes determining whether a creative associated with the retrieved potential creative URL is a FLASH object or an image if the retrieved potential creative URL is not a redirected URL, determining whether a width and a height of the FLASH object or the image exceed a predetermined threshold if the creative associated with the retrieved potential creative URL is a FLASH object or an image, and indicating the creative associated with the retrieved potential creative URL as being invalid if the creative associated with the retrieved potential creative URL is not an object created by multimedia software for creating vector graphics, animation, etc., (such as a FLASH object), or an image. The predetermined threshold may be set at five pixels. The analysis further includes indicating the creative associated with the retrieved potential creative URL as being valid if the width and the height of the FLASH object or the image exceed the predetermined threshold, and storing the retrieved potential creative URL in the data storage for comparison with further retrieved potential creative URLs.

According to an example, the online content collection system is configured to detect, process and store creatives and associated creative URLs and click thrus. The creatives, URLs and click thrus may be used for subsequent analysis, for example, for generating reports. The creative, which may be an online ad that includes, for example, images, click thrus, FLASH objects, etc., may be used to provide a message on a web site. The message in the creative is typically a marketing message promoting products or services, which may be offered for sale. A click thru URL for a creative may be clicked on by a user, which may take the user to the product web site or another web site promoting the product or service.

Technical problems for which the examples provide technical solutions include how to capture creatives and click thrus from the Internet. Also, once potential creatives and click thrus are captured, a technical problem is how to determine if the creatives or click thrus are valid. Another technical problem is to determine how to efficiently capture creatives and click thrus. According to an example, the online content collection system is operable to retrieve and analyze creative URLs to determine if creatives that the creative URLs point to have been previously analyzed by the online content collection system. If the creatives or associated click thrus have been previously analyzed, the online content collection system uses results from the previous analysis to analyze new potential creative URLs to thus eliminate redundant analysis. The online content collection system is also operable to analyze the validity of a creative and associated click thrus before storage in a database.

In order for the online content collection system to scan and detect creatives and associated click thrus, in one example, a scan server cloud is used to scan web sites dispersed over a wide geographic area. The scanning may be performed for a predetermined set of web sites, which are identified by a client, or for a much larger group of web sites, or for both a predetermined set and for a much larger group of web sites.

The online content collection system includes fail over capability if a scan server in the a scan server cloud is offline. If a website in a pool of websites stops detecting creatives, the online content collection system indicates an error for the given website, thus eliminating the need for analysis for such inoperable websites. The online content collection system also provides for detection of creatives inside Iframes of a web page. Iframes are embedded HTML documents in a web page. Iframes may be scanned recursively if an Iframe contains another Iframe.

2. System and Method

FIG. 1 illustrates a high-level data flow diagram for the online content collection system 120. At block 101, the online content collection system 120 receives a client request that may include a list of all the web sites in which the client's ads (i.e., creatives) are supposed to be posted. At block 102, the client request may also include the type of analysis desired. For example, as described in U.S. patent application Ser. No. 13/455,885, entitled "Online Content Campaign Classification", the client may be interested in a competitor analysis, a cost analysis, or a benchmarking analysis. The competitor analysis evaluates the client's ad campaign relative to a predetermined set of competitors based on metrics. The cost analysis evaluates the client's ad campaign effectiveness versus cost. The benchmark analysis may analyze the presence of the client's ads, such as whether they are delivered, whether the ads are in the proper page location and have the proper content, frequency of occurrence, such as number of ads posted on the web page or web site, uniqueness of images in ads, and trends. At block 103, various reports may be generated based on the analysis at block 102. For example, the reports may include competitor analysis reports, cost analysis reports, or benchmarking analysis reports.

At 104, the online content collection system 120 scans the Internet to capture creative URLs for a client's ad campaign. The scan may cover the set of web sites provided by the client or a larger search space. FIG. 1 shows web pages 110a-x, including creatives 111a-n.

At 105, the online content collection system 120 retrieves a potential creative URL from the content of one of the web pages 110a-x. The URL retrieved may represent a creative or a beacon representing a creative. A beacon, also referred to as a web beacon, is code for a web page that is able to retrieve information from another server. The beacon may be a unique identifier or include a unique identifier for the creative or client. The beacon may be coded in hypertext markup language (HTML), a script programming language (e.g., JAVA script), multimedia software for creating vector graphics, animation, etc., (e.g., FLASH), etc., and is identifiable by parsing the code of a web page.

Figure 2:
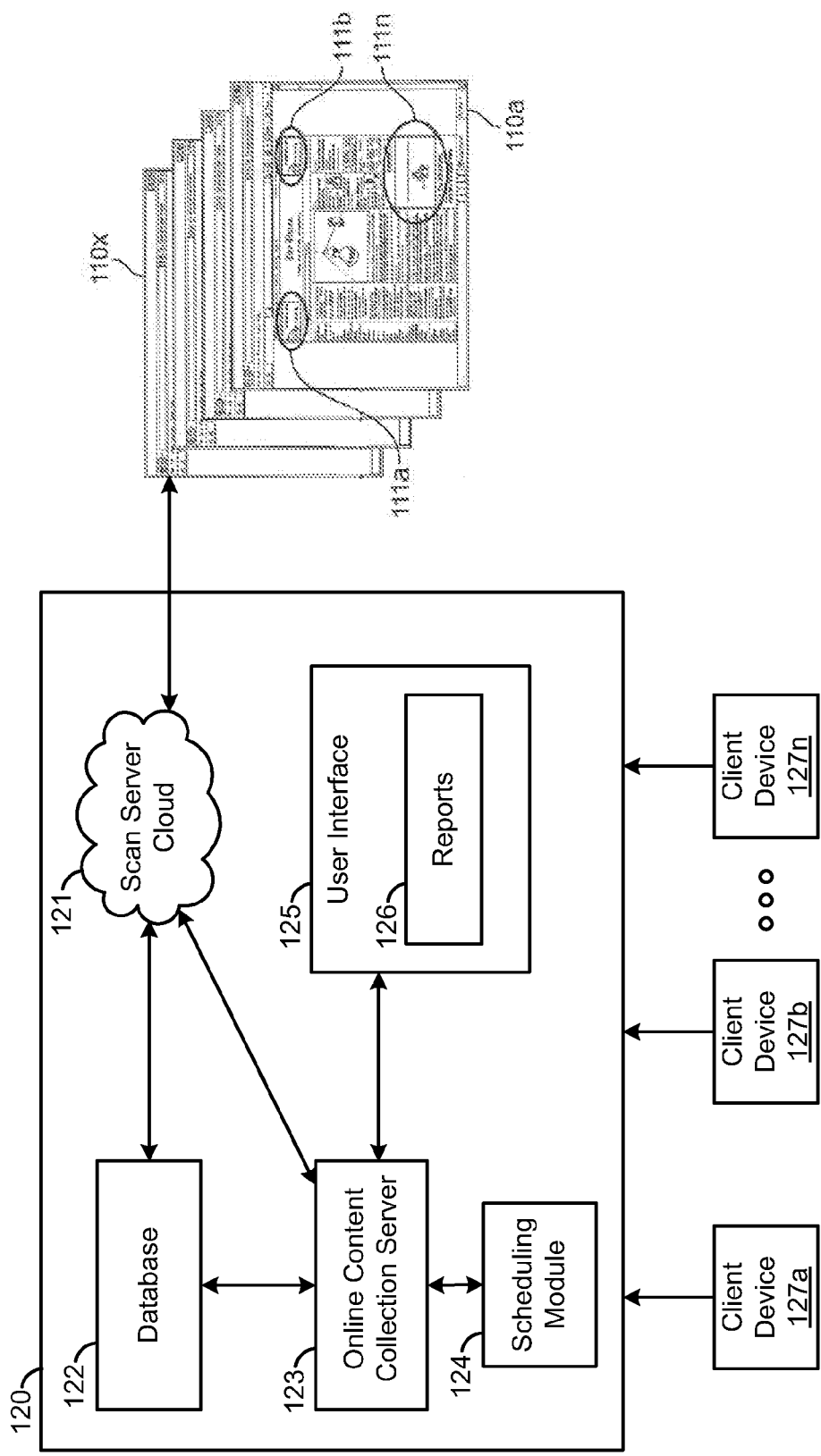
FIG. 2 illustrates a system diagram for the online content collection system, according to an example of the present disclosure.

FIG. 2 illustrates a more detailed block diagram of the online content collection system 120. The online content collection system 120 includes a scan server cloud 121, a database 122, online content collection server 123, and scheduling module 124. The scan server cloud 121 includes multiple scan servers placed at different locations around the world to provide scalable website scanning and analysis. Each scan server scans a specific set of websites. For example, one scan server in the scan server cloud 121 may be responsible for scanning web pages 110a-x which are geographically hosted near the scan server. Other servers scan other geographic areas. Together the scan server cloud 121 covers all sites requested by a client for analysis. The database 122 stores creatives, creative URLs, click thrus, beacons, website structure data, ad metrics and any other information received from the scanning performed by the scan server cloud 121. Alternatively, the information stored in the database 122 may be stored in the online content collection server 123. The database 122 or another database stores client information, so the ad information determined from the scanning can be matched to the client information.

The online content collection server 123 receives and compiles information from the scan server cloud 121. This includes potential creative URLs from web page content. The scan severs of the scan server cloud 121 may detect creatives in the set of web sites provided by the client or a larger search space. For the creatives detected, the scan servers detect the URL of each creative. The online content collection server 123 may further match the scanned creative information and client information stored in the database 122. The matching associates the scanned creative information to the corresponding client. The online content collection server 123 also uses the scanned information to classify online creatives into creative campaigns.

The online content collection server 123 also generates reports, which may be compiled from the attributes and metrics for the client's ads captured during the scan performed by the scan server cloud 121. The reports may be displayed at user interface 125 as reports 126. The user interface 125 may be a graphical user interface (GUI) that allows users to dynamically search their advertising statistics, reports for viewing and information related to creatives. The user interface 125 may be provided through a web page, where the user can login and view the desired information. In addition to viewing reports, users may interact with the online content collection system 120 to view or provide different information, including websites for scanning, etc.

Client devices 127a-n, such as laptops, desktops, cellular phones, etc., may be connected, e.g., via a network, to the online content collection system 120 to interact with the system for example via the user interface 125.

The scheduling module 124 may provide periodic scanning of websites provided by a client. The scan frequency or interval may be determined to match the client's needs. For example, one client may require scans at short intervals, such as every 10 minutes for one hour, and repeated twice daily. This type of scan interval will capture a large sample set of potential creative URLs in web sites being scanned. Another client may not need short interval scans. For example, one or two scans daily may be performed for potential creative URL retrieval. The scan server cloud 121 shown in FIG. 2 provides the flexibility to modify scan frequencies and areas or web sites to be scanned. The scan server cloud 121 is configured to receive requested scan frequencies and web site lists or scan regions for a client and retrieve potential creative URLs from the scans.

As described herein, the modules and other elements of the system 120 may comprise machine readable instructions stored on a non-transitory computer readable medium. In addition, or alternatively, the modules and other elements of the system 120 may comprise hardware or a combination of machine readable instructions and hardware.

Figure 3:
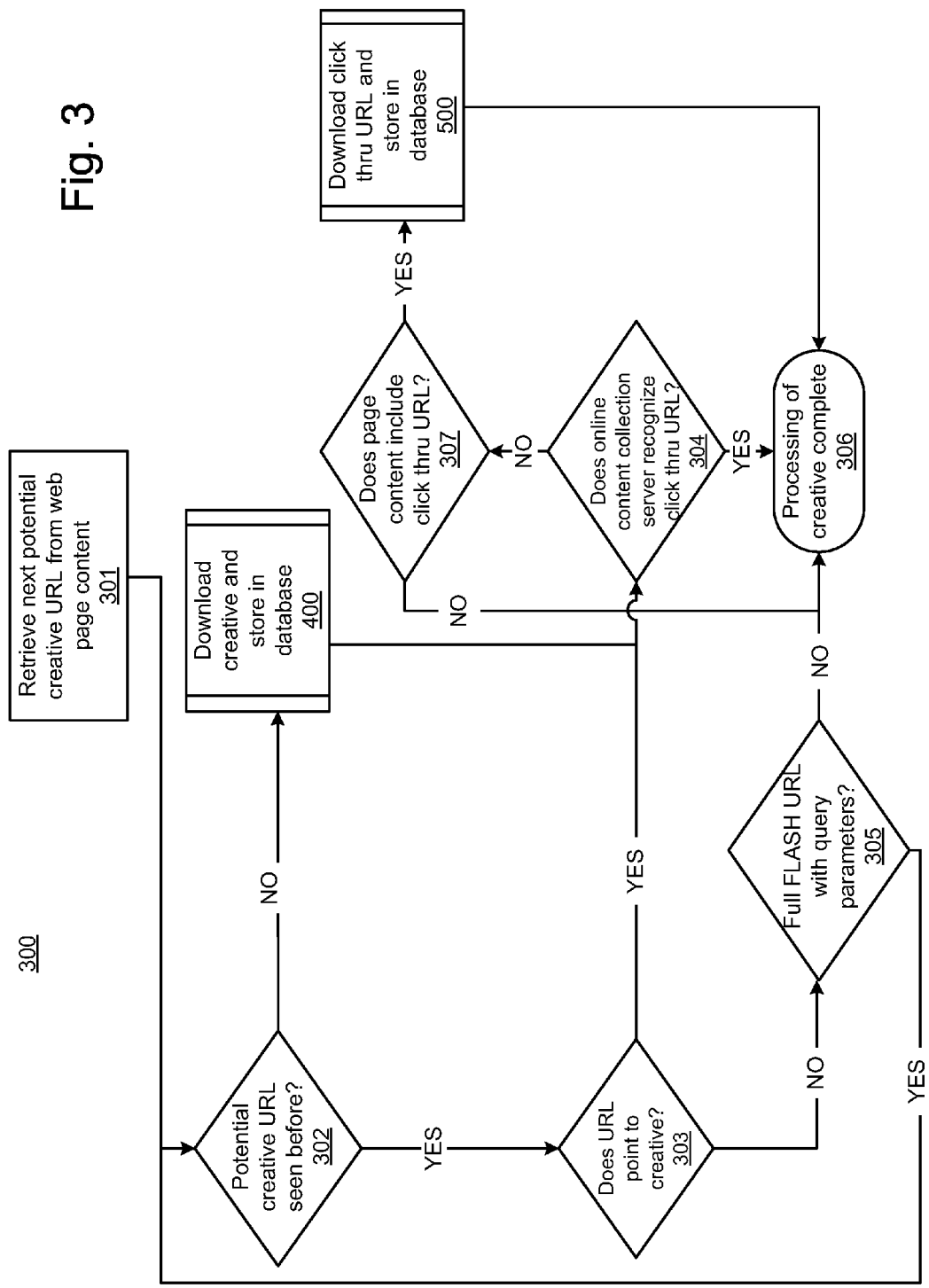
FIG. 3 illustrates a flow chart for a method for creative uniform resource locator (URL) and click thru processing by the online content collection system, according to an example of the present disclosure.

FIG. 3 illustrates a flow chart of a method 300 for creative URL and click thru processing during scanning by the online content collection system 120. The method 300, and further, the methods 400 and 500 described with reference to FIGS. 4 and 5, respectively, may be implemented on the online content collection system 120 with reference to FIGS. 1 and 2 by way of example and not limitation. The methods 300, 400 and 500 may be practiced in other systems. The scan servers in the scan server cloud 121 shown in FIG. 2 may use the method 200 to perform the scanning and retrieval of potential creative URLs as described herein.

Referring to FIG. 3, at block 301, the scan servers in the scan server cloud 121 retrieve a next potential creative URL from web page content. The scan severs may detect creatives in the set of web sites provided by the client or a larger search space. For the creatives detected, the scan servers detect the URL of each creative. For FLASH URLs, the query parameters are removed. The query parameters generally include random numbers that identify a user. Removing the query parameters thus eliminates duplication of URLs that are stored in the database 122 and redundant analysis of duplicate URLs by the online content collection server 123. The scan servers in the scan server cloud 121 may detect creatives by loading web pages 110a-x into a web browser. The source code of the web pages 110a-x may be evaluated to locate images that match regular expressions that are specified for retrieving creative URLs. For example, a regular expression may specify that any URL associated with domain abcclick.net may be located and retrieved for further determining whether the URL points to an image or a FLASH object that is a potential creative.

At block 302, the online content collection server 123 determines if the potential creative URL has been seen before. If the potential creative URL has not been seen before, the creative represented by the potential creative URL may be downloaded and stored in the database 122. Alternatively, the creative represented by the potential creative URL may be downloaded and stored in the online content collection server 123. Downloading and storage of a creative represented by the potential creative URL in the database 122 may be performed by the method represented by block 400, described in further detail with reference to FIG. 4.

If the potential creative URL has been seen before at block 302, at block 303, the online content collection server 123 determines if the potential creative URL in fact points to a creative. Based on a comparison with creative URLs stored in the database 122 to determine whether the creative URL in fact points to a creative, if the creative URL points to a creative, the online content collection server 123 obtains information, such as, md5sum, file size, creative type, image size, image height, image width, and the click thru URL for the creative URL. The information for the creative URL is sent to block 304, where a determination is made whether the online content collection server 123 recognize the click thru URL associated with the potential creative URL. The determination made at block 304 is described in further detail below.

At block 305, if the online content collection server 123 determines that the potential creative URL does not point to a creative, a determination is made whether the potential creative URL is a full FLASH URL with query parameters. If the potential creative URL is a full FLASH URL with query parameters, the online content collection server 123 reverts to block 302 to determine if the full FLASH URL with query parameters has been seen before. If the full FLASH URL with query parameters has not been seen before, the creative represented by the full FLASH URL with query parameters may be downloaded and stored in the database 122 by the method represented by block 400. If the full FLASH URL with query parameters has been seen before at block 302, at block 303, the online content collection server 123 determines if the full FLASH URL with query parameters in fact points to a creative. Based on a comparison with creative URLs stored in the database 122 to determine whether the full FLASH URL with query parameters in fact points to a creative, if the full FLASH URL with query parameters points to a creative, the online content collection server 123 obtains information, such as, md5sum, file size, creative type, image size, image height, image width, and the click thru URL for the full FLASH URL with query parameters. The information for the full FLASH URL with query parameters is sent to block 304, where a determination is made whether the online content collection server 123 recognize the click thru URL associated with the potential creative URL (i.e., the full FLASH URL with query parameters). Alternatively, at blocks 303 and 305, if the online content collection server 123 determines that the full FLASH URL with query parameters does not point to a creative, at block 306, processing of the creative is complete.

Referring to block 304, a determination is made whether the online content collection server 123 recognize the associated click thru URL for the potential creative URL, which may be a full FLASH URL with query parameters. If the online content collection server 123 recognizes the associated click thru URL, processing of the creative is complete at block 306. Alternatively, if the online content collection server 123 does not recognize the associated click thru URL, at block 307, a determination is made whether the current web page includes a click thru URL. If the current web page does not include a click thru URL, processing of the creative is complete at block 306. Alternatively, if the current web page includes a click thru URL, the click thru URL may be downloaded and stored in the database 122. Alternatively, the click thru URL may be downloaded and stored in the online content collection server 123. Downloading and storage of a click thru URL in the database 122 or the online content collection server 123 may be performed by the method represented by block 500, described in further detail with reference to FIG. 5.

Referring to block 400, once the creative represented by the potential creative URL, which may be the full FLASH URL with query parameters, is downloaded and stored by the method represented by the block 400, at block 304 a determination is made whether the online content collection server 123 recognize the associated click thru URL for the potential creative URL. As discussed above with reference to block 304, if the online content collection server 123 recognizes the associated click thru URL, processing of the creative is complete at block 306. Alternatively, if the online content collection server 123 does not recognize the associated click thru URL, at block 307, a determination is made whether the current web page includes a click thru URL. If the current web page does not include a click thru URL, processing of the creative is complete at block 306. Alternatively, if the current web page includes a click thru URL, the click thru URL may be downloaded and stored in the database 122 or the online content collection server 123 by the method represented by the block 500.

Figure 4:
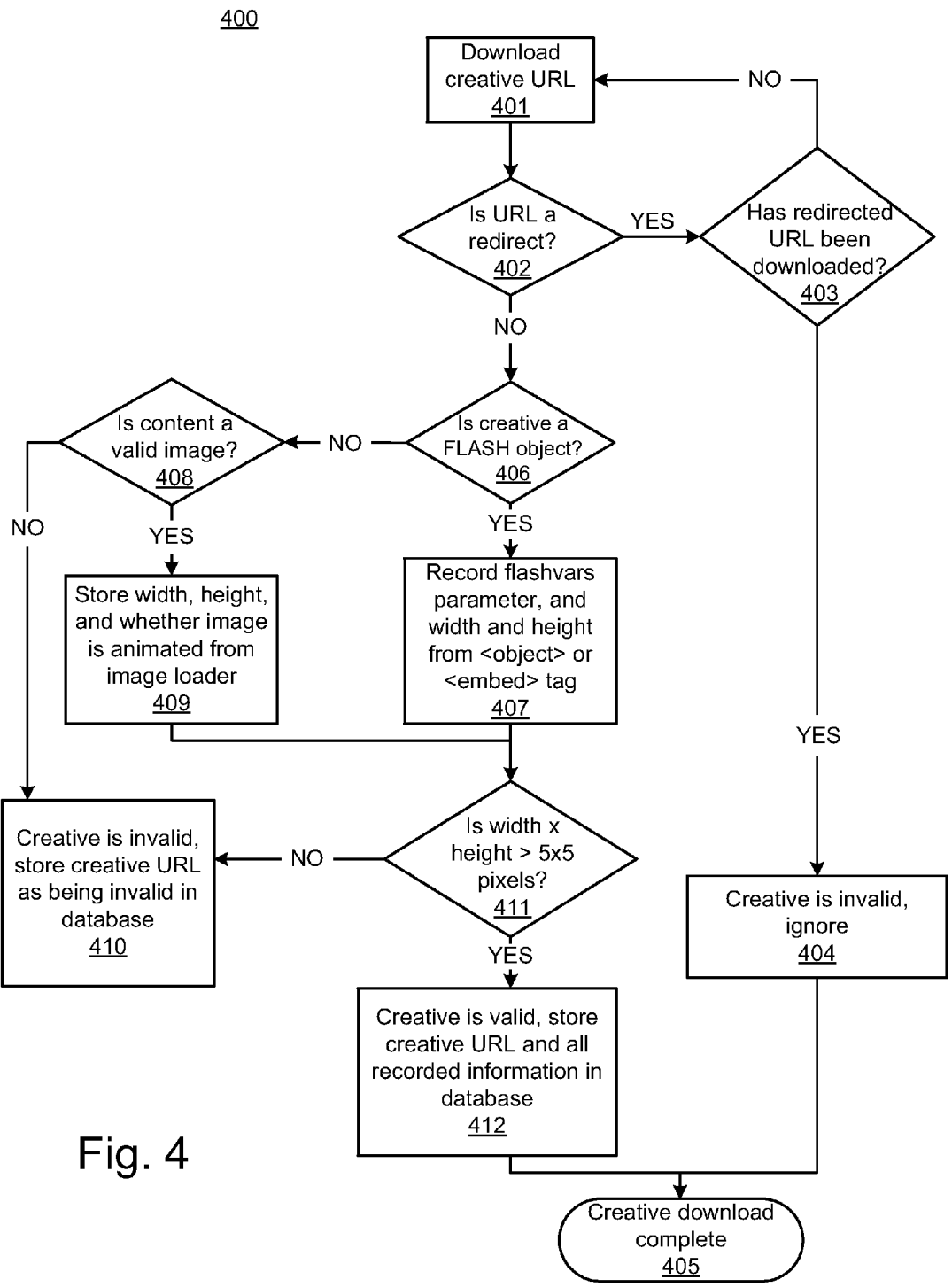
FIG. 4 illustrates a flow chart for a method for creative download and storage in a database or an online content collection server, according to an example of the present disclosure.

FIG. 4 illustrates a flow chart of the block 400 (i.e., method 400) for creative download and storage in the database 122 or the online content collection server 123. Referring to FIGS. 3 and 4, in order to download and store a creative represented by the potential creative URL, which may be the full FLASH URL with query parameters, for the method represented by the block 400 of FIG. 1, at block 401, the creative URL is downloaded from its web server. The scan servers in the scan server cloud 121 may download the creative URL from its web server.

At block 402, a determination is made whether the URL is a redirect. If the URL is a redirect, at block 403, a determination is made whether the redirected URL has been downloaded. In other words, at block 403, a determination is made whether the redirected URL has been seen before. At block 403, the online content collection server 123 checks the database 122 to determine if the redirected URL has been downloaded before. If the redirected URL is determined to be previously downloaded at block 403, this means that the redirect is a circular redirect and the URL is invalid. Therefore, at block 403, if the redirected URL is determined to be previously downloaded, at block 404, the redirected URL, and thus the creative, is determined to be invalid, and at block 405, download and storage of the creative is complete. This evaluation at block 403 avoids infinite looping of a redirected URL. If at block 403 a determination is made that the redirected URL has not been previously downloaded, the online content collection server 123 reverts back to block 401 to download a subsequent redirected URL. In this manner, for redirected URLs that have not been previously downloaded, the online content collection server 123 loops between blocks 401, 402 and 403 to download subsequent redirected URLs, until a determination is made that the URL is not a redirect at block 402 or the redirected URL has been previously downloaded at block 403, at which time the online content collection server 123 proceeds to block 404 and then to block 405 where download and storage of the creative is completed.

At block 402, if a determination is made that the URL is not a redirect, at block 406, a determination is made whether the URL points to a creative that is a FLASH object. For example, if the URL points to a creative that has an image-file format that is a joint photographic experts group (JPEG), a portable network graphics (PNG), or a graphics interchange format (GIF), the creative is not a FLASH object. Alternatively, if the URL points to a creative that has an object tag or an embed tag, than the creative is determined to be a FLASH object. In this case, at block 407, if the creative is determined to be a FLASH object, the flashvars parameter, and the width and height of the FLASH object from the <object> or <embed> tag are recorded for the FLASH object.

Referring to block 408, if at block 406 a determination is made that the URL does not point to a creative that is a FLASH object, then the creative is determined to likely be an image. At block 408, if the creative is determined to likely be an image, a determination is made whether the downloaded creative URL points to content that is a valid image. The validity of the image may be determined by an image loading component of the online content collection server 123, for example, by loading the image. If the image loads properly (i.e., without errors), at block 409, information such as the image width, the image height and whether the image is animated is stored in the database 122 or the online content collection server 123. If at block 408 a determination is made that the downloaded creative URL does not point to content that is a valid image, at block 410, the creative is determined to be invalid and the creative URL is stored as being invalid in the database 122 or the online content collection server 123. In this manner, referring to block 302 of FIG. 3, the creative URL stored at block 410 can be used to determine if other potential creative URLs have been seen before.

Referring to blocks 407 and 409, after recordation of the flashvars parameter, and the FLASH object width and height from the <object> or <embed> tag at block 407, or storage of the image width, the image height and whether the image is animated at block 409, at block 411, the width and height of the creative is evaluated. At block 411, if the width and height of the creative is determined to be greater than a predetermined threshold of 5 pixels each (i.e., width×height>5×5 pixels), then at block 412, the creative is determined to be valid and the creative URL and all recorded information is stored in the database 122 or the online content collection server 123. In this manner, referring to block 303 of FIG. 3, the creative URL stored at block 412 can be used to determine if other potential creative URLs, which may be full FLASH URLs with query parameters, in fact point to a creative. If the width and height of the creative is determined to be less than or equal to the predetermined threshold of 5 pixels each (i.e., width×height<5×5 pixels), then at block 410, the creative is determined to be invalid and the creative URL is stored as being invalid in the database 122 or the online content collection server 123. Thus the online content collection server 123 eliminates beacons, which can have a width and height of 1 pixel, and other images or FLASH objects that have a width and height that is determined to be less than or equal to the predetermined threshold of 5 pixels each as being valid creatives. With the creative URL stored at block 412, at block 405, download and storage of the creative is complete.

Figure 5:
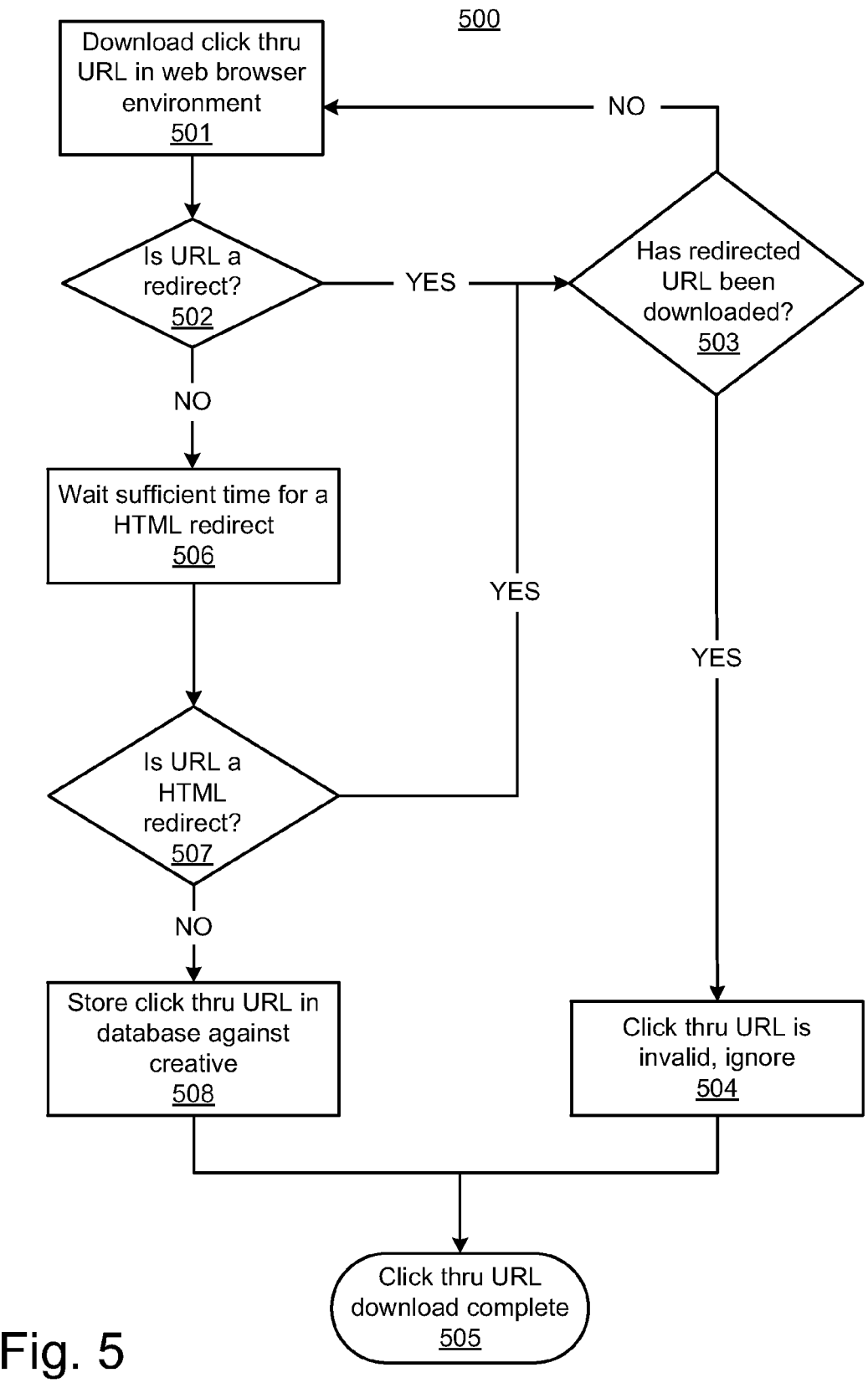
FIG. 5 illustrates a flow chart for a method for click thru download and storage in the database or the online content collection server, according to an example of the present disclosure.

FIG. 5 illustrates a flow chart of the block 500 (i.e., method 500) for click thru download and storage in the database 122 or the online content collection server 123. Referring to FIGS. 3 and 5, in order to download and store a click thru URL associated with the potential creative URL or the full FLASH URL with query parameters, for the method represented by the block 500 of FIG. 1, at block 501, the click thru URL is downloaded in a web browser environment. The scan servers in the scan server cloud 121 may download the click thru URL.

At block 502, a determination is made whether the click thru URL is a redirect. If the click thru URL is a redirect, at block 503, a determination is made whether the redirected URL has been downloaded. In other words, at block 503, a determination is made whether the redirected URL has been seen before. At block 503, the online content collection server 123 checks the database 122 to determine if the redirected URL has been downloaded before. If the redirected URL is determined to be previously downloaded at block 503, this means that the redirect is a circular redirect and the URL is invalid. Therefore, at block 503, if the redirected URL is determined to be previously downloaded, at block 504, the redirected URL, and thus the click thru URL, is determined to be invalid, and at block 505, download and storage of the click thru URL is complete. This evaluation at block 503 avoids infinite looping of a redirected URL. If at block 503 a determination is made that the redirected URL has not been previously downloaded, the online content collection server 123 reverts back to block 501 to download a subsequent redirected URL. In this manner, for redirected URLs that have not been previously downloaded, the online content collection server 123 loops between blocks 501, 502 and 503 to download subsequent redirected URLs, until a determination is made that the URL is not a redirect at block 502 or the redirected URL has been previously downloaded at block 503, at which time the online content collection server 123 proceeds to block 504 and then to block 505 where download and storage of the click thru URL is completed.

At block 502, if a determination is made that the URL is not a redirect, at block 506, the online content collection server 123 waits a predetermined time interval, such as, three seconds, for a HTML redirect. At block 507, if a determination is made that a HTML redirect has occurred within the predetermined time interval, the online content collection server 123 proceeds to block 503 to determine if the redirected URL has been downloaded. Alternatively, if a determination is made at block 507 that a HTML redirect has not occurred within the predetermined time interval, then at block 508, the click thru URL is stored in the database 122 or the online content collection server 123 and matched with the appropriate creative. Once the click thru URL is stored in the database 122 or the online content collection server 123, the online content collection server 123 proceeds to block 505 where download and storage of the click thru URL is completed. Referring to FIGS. 3 and 5, the valid click thru URL stored based on block 508 or determined as being invalid based on block 504 may be used at block 304 to determine whether the online content collection server 123 recognize the associated click thru URL.

3. Computer Readable Medium

Figure 6:
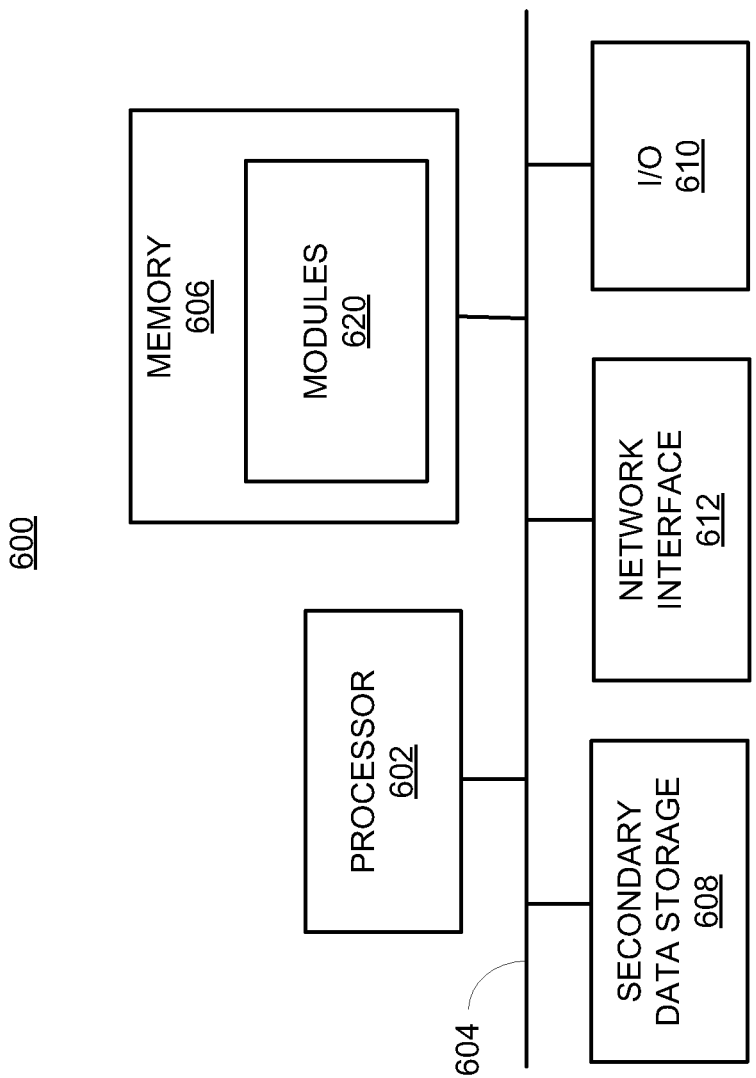
FIG. 6 illustrates a computer system that may be used for the methods and systems, according to an example of the present disclosure.

FIG. 6 shows a computer system 600 that may be used with the examples described herein. The computer system represents a generic platform that includes components that may be in a server or another computer system. The computer system may be used as a platform for the system 120. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and FLASH memory).

The computer system includes a processor 602 that may implement or execute machine readable instructions performing some or all of the methods, functions and other processes described herein. Commands and data from the processor 602 are communicated over a communication bus 604. The computer system also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include modules 620 including machine readable instructions residing in the memory 606 during runtime and executed by the processor 602. The modules 620 may include the module 124 of the system shown in FIG. 2, and other components of the system 120, such as the online content collection server 123.

The computer system may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An online content collection system comprising:
   a scanning server to scan web sites to retrieve a potential creative uniform resource locator (URL), wherein the scanning and retrieving comprises:
      loading web pages for the web sites into a browser,
      regular expression matching source code of the web pages to predetermined criterion,
      identifying the potential creative URL from the source code of the web pages that matches the predetermined criterion, and
      retrieving the potential creative URL that matches the predetermined criterion;
   data storage storing creative URLs, wherein the stored creative URLs include URLs previously retrieved by the scanning server; and
   an online content collection server analyzing the retrieved potential creative URL, wherein the analyzing comprises:
   determining whether the retrieved potential creative URL is a redirect URL;
   in response to determining the retrieved potential creative URL is a redirect URL, determining the redirect URL is invalid if the redirect URL matches one of the stored creative URLs previously retrieved by the scanning server; and
   in response to determining the retrieved potential creative URL is not a redirect URL,
      identifying a creative associated with the retrieved potential creative URL,
      determining whether the creative includes an image or an object associated with multimedia;
      in response to determining the creative includes the image,
         analyzing pixels of the image to determine an image width and an image height in terms of pixels of the image;
         in response to determining the width and height of the image is greater than a threshold of a predetermined number of pixels for each of the width and height,
            determining the retrieved potential creative URL is valid and,
            storing the retrieved potential creative URL as a valid creative URL in the data storage; and
      in response to determining the creative includes the object associated with multimedia,
         determining a width and height of the object from a tag embedded in the source code,
         determining if the width and the height of the object is greater than the threshold of the predetermined number of pixels for each of the width and height, and
         storing the retrieved potential creative URL as a valid creative URL in the data storage if the width and the height of the object is greater than the threshold.

2. The online content collection system of claim 1, wherein the regular expression matching comprises regular expression matching the source code to at least one URL associated with providing online advertisements.

3. A method for online content collection, the method comprising:
   scanning web sites for potential creative uniform resource locators (URLs), wherein the scanning comprises:
      loading web pages for the web sites into a browser; and
      regular expression matching source code of the web pages to predetermined criterion;
   retrieving a potential creative URL from the scanning that matches the predetermined criterion for retrieving potential creative URLs;
   storing creative URLs in a data storage, wherein the stored creative URLs include URLs previously scanned and downloaded;
   analyzing the retrieved potential creative URL, wherein the analyzing comprises:
      determining whether the retrieved potential creative URL is a redirect URL;
      in response to determining the retrieved potential creative URL is a redirect URL, determining the redirect URL is invalid if the redirect URL matches one of the stored creative URLs previously retrieved by the scanning server; and
      in response to determining the retrieved potential creative URL is not a redirect URL,
         identifying a creative associated with the retrieved potential creative URL;
         determining whether the creative includes an image or an object associated with multimedia;
         in response to determining the creative includes the image,
            analyzing pixels of the image to determine an image width and an image height in terms of pixels of the image;
            in response to determining the width and height of the image is greater than a threshold of a predetermined number of pixels for each of the width and height,
               determining the retrieved potential creative URL is valid, and storing the retrieved potential creative URL as a valid creative URL in the data storage; and in response to determining the creative includes the object associated with multimedia, determining a width and height of the object from a tag embedded in the source code, determining if the width and the height of the object is greater than the threshold of the predetermined number of pixels for each of the width and height, and storing the retrieved potential creative URL as a valid creative URL in the data storage if the width and the height of the object is greater than the threshold.

4. A non-transitory computer readable medium including computer code that when executed by a computer system performs instructions comprising:

scanning web sites for potential creative uniform resource locators (URLs) wherein the scanning comprises:
loading web pages for the web sites into a browser; and
regular expression matching source code of the web pages to predetermined criterion;

retrieving a potential creative URL from the scanning that matches the predetermined criterion;

storing creative URLs in a data storage, wherein the stored creative URLs include URLs previously scanned and downloaded;

analyzing the retrieved potential creative URL, wherein the analyzing comprises:

determining whether the retrieved potential creative URL is a redirect URL;

in response to determining the retrieved potential creative URL is a redirect URL, determining the redirect URL is invalid if the redirect URL matches one of the stored creative URLs previously retrieved by the scanning server; and in response to determining the retrieved potential creative URL is not a redirect URL, identifying a creative associated with the retrieved potential creative URL;

determining whether the creative includes an image or an object associated with multimedia;

in response to determining the creative includes the image, analyzing pixels of the image to determine an image width and an image height in terms of pixels of the image;

in response to determining the width and height of the image is greater than a threshold of a predetermined number of pixels for each of the width and height, determining the retrieved potential creative URL is valid, and storing the retrieved potential creative URL as a valid creative URL in the data storage; and in response to determining the creative includes the object associated with multimedia, determining a width and height of the object from a tag embedded in the source code, determining if the width and the height of the object is greater than the threshold of the predetermined number of pixels for each of the width and height, and storing the retrieved potential creative URL as a valid creative URL in the data storage if the width and the height of the object is greater than the threshold.

5. The non-transitory computer readable medium of claim 4, wherein the regular expression matching comprises regular expression matching the source code to at least one URL associated with providing online advertisements.

6. The non-transitory computer readable medium of claim 4, wherein the threshold comprises a threshold of 5 pixels for each of the width and height.

7. The online content collection system of claim 1, wherein the threshold comprises a threshold of 5 pixels for each of the width and height.

8. The method for online content collection of claim 3, wherein the threshold comprises a threshold of 5 pixels for each of the width and height.

9. The method for online content collection of claim 3, wherein the regular expression matching comprises regular expression matching the source code to at least one URL associated with providing online advertisements.

* * * * *